(12) United States Patent
Shin et al.

(10) Patent No.: US 6,864,876 B2
(45) Date of Patent: Mar. 8, 2005

(54) MICRO-MIRROR DEVICE FOR AN IMAGE DISPLAY APPARATUS AND METHOD OF USING THE SAME

(75) Inventors: Jong-woo Shin, Suwon (KR); Soon-cheol Kweon, Seoul (KR); Hyung-jae Shin, Seongnam (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 192 days.

(21) Appl. No.: 09/725,959

(22) Filed: Nov. 30, 2000

(65) Prior Publication Data

US 2001/0035846 A1 Nov. 1, 2001

(30) Foreign Application Priority Data

May 1, 2000 (KR) .......................................... 2000-23270

(51) Int. Cl.⁷ ................................................. G09G 3/34
(52) U.S. Cl. .......................... 345/108; 345/55; 345/84; 345/85; 345/204
(58) Field of Search .............................. 345/55, 84, 85, 345/108, 204; 359/838, 237, 224

(56) References Cited

U.S. PATENT DOCUMENTS

| | | | | |
|---|---|---|---|---|
| 5,025,346 A | * | 6/1991 | Tang et al. ............... | 361/283.1 |
| 5,535,047 A | * | 7/1996 | Hornbeck ................... | 359/224 |
| 5,670,977 A | * | 9/1997 | Chiu et al. ................. | 345/205 |
| 5,784,212 A | * | 7/1998 | Hornbeck ................... | 359/214 |
| 6,025,951 A | * | 2/2000 | Swart et al. ................ | 359/245 |
| 6,028,689 A | * | 2/2000 | Michalicek et al. ........ | 359/224 |
| 6,046,840 A | * | 4/2000 | Huibers ....................... | 359/291 |
| 6,128,122 A | * | 10/2000 | Drake et al. ................. | 359/198 |
| 6,206,290 B1 | * | 3/2001 | Giebel et al. ........... | 235/462.36 |
| 6,323,982 B1 | * | 11/2001 | Hornbeck ................... | 359/198 |
| 6,404,534 B1 | * | 6/2002 | Chin et al. .................. | 348/771 |
| 2002/0054415 A1 | * | 5/2002 | Lee ............................ | 359/223 |

FOREIGN PATENT DOCUMENTS

| EP | 0 563 546 A1 | 10/1993 |
|---|---|---|
| EP | 0 664 470 A2 | 7/1995 |
| EP | 0 769 713 A2 | 4/1997 |
| EP | 0 949 527 A1 | 10/1999 |

* cited by examiner

*Primary Examiner*—Vijay Shankar
*Assistant Examiner*—Leonid Shapiro
(74) *Attorney, Agent, or Firm*—Sughrue Mion, PLLC (57) ABSTRACT

A micro-mirror device for an image display apparatus which can change the travel path of incident light by pivoting a mirror, which corresponds to a pixel and can increase optical efficiency by pivoting the mirror in the direction of the sides of the mirror. The micro-mirror device for an image display apparatus includes a substrate, a landing pad provided on the substrate, and a pair of base electrodes provided on opposite sides of the landing pad. A pair of first posts protrude from the upper surface of the landing pad, and are isolated from each other by a predetermined interval. A girder, supported by the pair of first posts, pivots toward the sides of the base electrodes due to an electrostatic attraction. A second post protrudes from the upper surface of the girder. A mirror, which is supported by the second post, reflects incident light, and receives power via the landing pad. Thus, the mirror is pivoted toward the sides of the landing pad by the electrostatic attraction between the base electrodes and the mirror.

17 Claims, 6 Drawing Sheets

MICRO-MIRROR DEVICE FOR AN IMAGE DISPLAY APPARATUS AND METHOD OF USING THE SAME

BACKGROUND OF THE INVENTION

1. Field of the Invention

The present invention relates to a micro-mirror device for an image display apparatus which can change the traveling path of incident light by pivoting a mirror that is installed to correspond to each pixel and, more particularly, to a micro-mirror device for an image display apparatus and method which can increase optical efficiency by pivoting a mirror in the direction of the sides of the mirror.

2. Description of the Related Art

In general micro-mirror devices for an image display apparatus include a plurality of mirrors that are installed to be driven by an electrostatic force to reflect incident light at a predetermined angle. These micro-mirror devices are used in image display devices of projection televisions, and optical scanning devices such as scanners, photocopying machines, and facsimiles. In particular, when these micro-mirror devices are used in image display devices, the number of mirrors equals the number of pixels arranged two-dimensionally, and each of the mirrors is driven in response to an image signal for a corresponding pixel, thus reflected light has varying paths of travel resulting in the formation of a picture.

Figure 1:
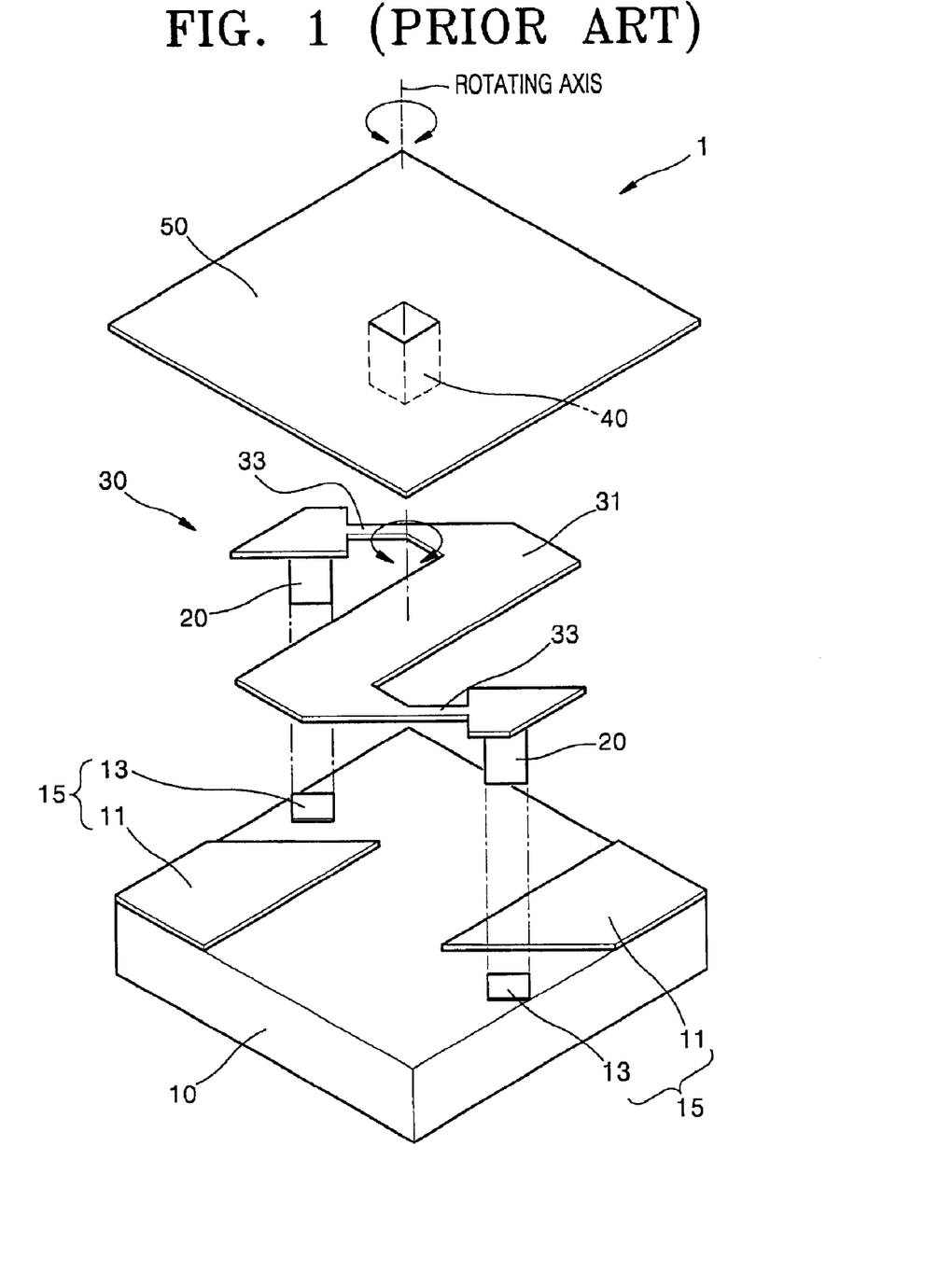
FIG. 1 is an exploded perspective view of a conventional diagonally-driven micro-mirror device for an image display device.

Referring to FIG. 1, a conventional micro-mirror device 1 for an image display apparatus includes a substrate 10, a pair of first posts 20 formed on the substrate 10, an electrode 15 formed on the substrate 10, a girder or support assembly 30, and a second post 40 which protrudes from the girder 30. The device also includes a mirror 50 supported by the second post 40, which changes a reflection angle of incident light upon its upper surface according to an inclination angle that is determined by electrostatic attraction. The pair of first posts 20, which support the girder 30, protrude vertically from the substrate 10 by a predetermined amount and are isolated a predetermined distance apart from each other. The electrode 15 includes a pair of base electrodes 11 installed on the substrate 10, which are isolated a predetermined distance apart from each other, and connection electrodes 13, which are formed on the substrate 10 so as to contact one end of each of the first posts 20, and apply current to the mirror 50. The girder 30 is pivoted on portions that are supported by the pair of first posts 20. The girder 30 is made up of a horizontal supporter 31 for supporting the second post 40, and a pair of springs 33 that, respectively, connect the pair of first posts 20 to both ends of the horizontal supporter 31. The pair of springs 33, which are elastically deformed by mutual electrostatic attraction between the mirror 50 and the base electrode 11, are rotated in opposite directions as the electrostatic attraction is created. Thus, the horizontal supporter 31 is pivoted, so that the mirror 50 is slanted vertically. In the micro-mirror device having such a structure, the base electrodes 11 are arranged on a diagonal line on the substrate 10, so that the mirror 50 pivots on a diagonal line, which forms a 45° angle with respect to the horizontal direction of the mirror 50.

Figure 2:
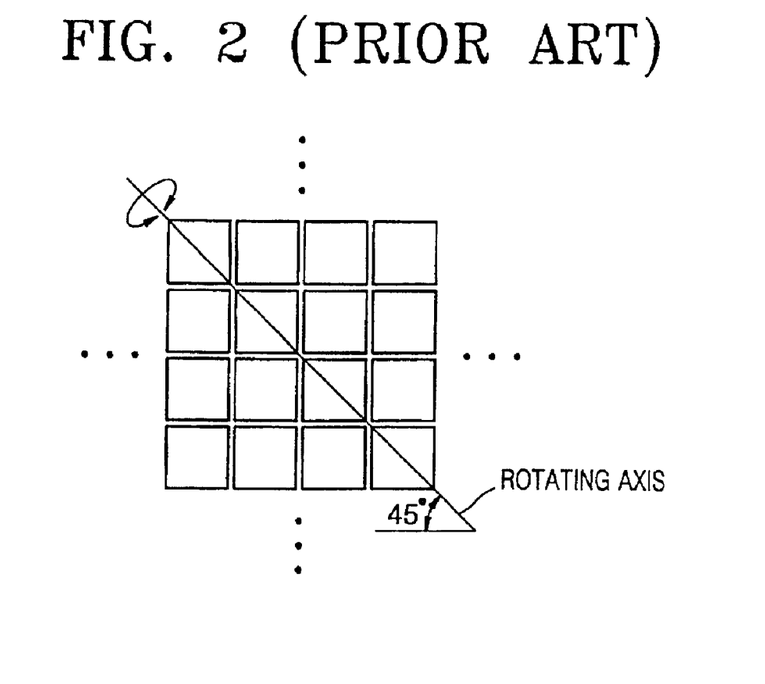
FIG. 2 is a plan view illustrating a part of a conventional micro-mirror device array.
Figure 3:
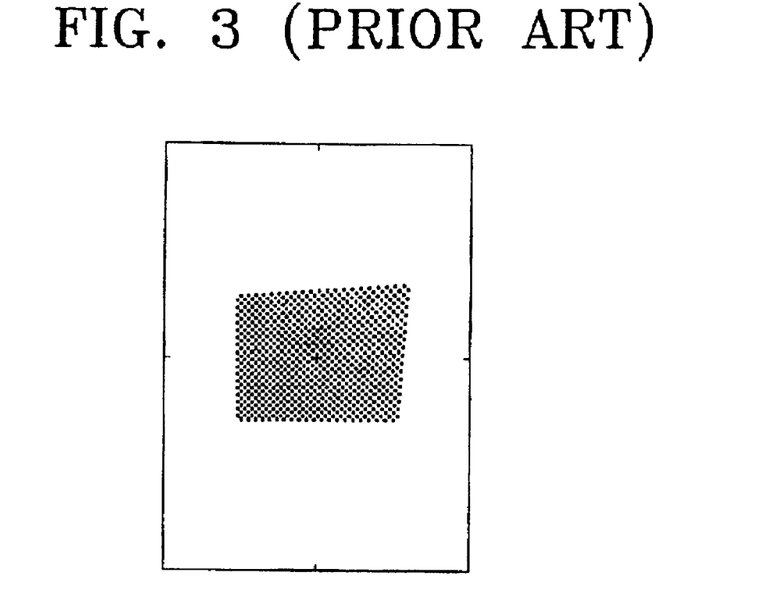
FIG. 3 is a plan view illustrating shapes of prior art micro-mirror devices viewed from a light source, when light is converged at 10° angles and illuminated to diagonally-driven micro-mirror devices for an image display apparatus which has a tilt angle of 20°.

When the micro-mirror device having the above-described structure is adopted in an image display apparatus, a plurality of micro-mirror devices are arranged in two-dimensional array structure, as shown in FIG. 2. The micro-mirror devices, arranged as described above, are driven around a rotating axis positioned on a diagonal line, resulting in shapes of the micro-mirror devices being projected as shown in FIG. 3, when viewed from a side of a light source that emits illuminating light to the micro-mirror devices 1. Specifically, FIG. 3 illustrates the shapes of the micro-mirror devices that are projected when light from the light source is converged at 10° angles and illuminated to the diagonally-driven micro-mirror devices 1 for an image display apparatus which pivots at ±10° angles, that is, which has a tilt angle of 20°. Compared to a tilt angle of 0° when parallel light beams are incident, the diagonally-driven micro-mirror device 1 has an optical efficiency of about 91%, which is obtained by taking the product of the cosine of the tilt angle and the square of the cosine of the convergence angle, i.e., cos(tilt angle)×cos²(convergence angle)=cos 20°×cos²(20°). Thus, an optical loss of about 9% is generated.

SUMMARY OF THE INVENTION

To solve the above problem, an objective of the present invention is to provide a micro-mirror device for an image display apparatus having an improved structure, and a method of using the same, where a mirror is pivoted in the direction of its sides.

The above objective of the present invention is achieved by a micro-mirror device for an image display apparatus, including: a substrate; a landing pad provided on the substrate; a pair of base electrodes provided on opposite sides of the landing pad; and a pair of first posts protruding from the upper surface of the landing pad that are isolated from each other by a predetermined interval. The invention further includes a girder which is supported by the pair of first posts and is pivoted toward the sides of the landing pad by an electrostatic attraction; a second post protruding from the upper surface of the girder; and a mirror which is supported by the second post that reflects incident light, and receives power via the landing pad. The mirror is pivoted toward the sides of the landing pad by the electrostatic attraction between the base electrodes and the mirror.

A method of reflecting light using a micro-mirror device in an image display apparatus is also contemplated. The method comprises supplying a driving voltage to at least one of a pair of base electrodes of the micro-mirror device and creating an electrostatic attraction between the at least one of the pair of the base electrodes and a mirror, wherein the mirror is pivoted around an axis formed in a lengthwise direction of the pair of base electrodes. The method further includes altering the driving voltage which is supplied to the at least one of the pair of base electrodes so that a reflection angle of light incident upon the mirror is controlled.

BRIEF DESCRIPTION OF THE DRAWINGS

The above objective and advantage of the present invention will become more apparent by describing in detail preferred embodiments thereof with reference to the attached drawings, in which.

DETAILED DESCRIPTION OF THE PREFERRED EMBODIMENTS

Figure 4:
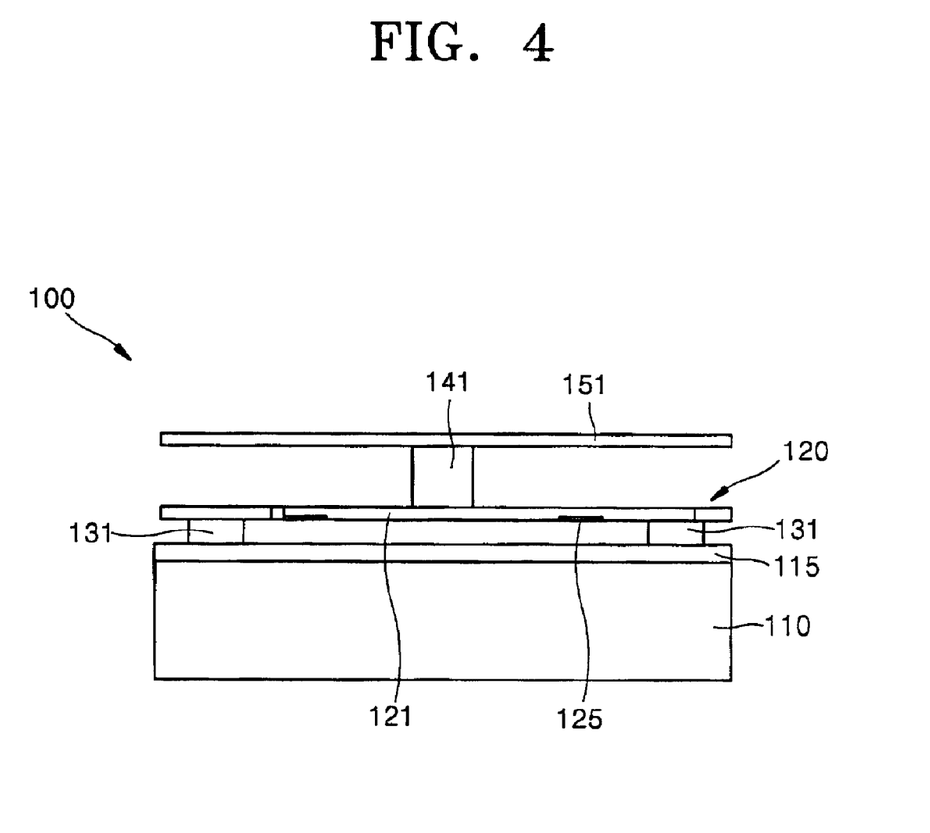
FIG. 4 is a front view of a micro-mirror device for an image display apparatus according to an embodiment of the present invention.
Figure 5:
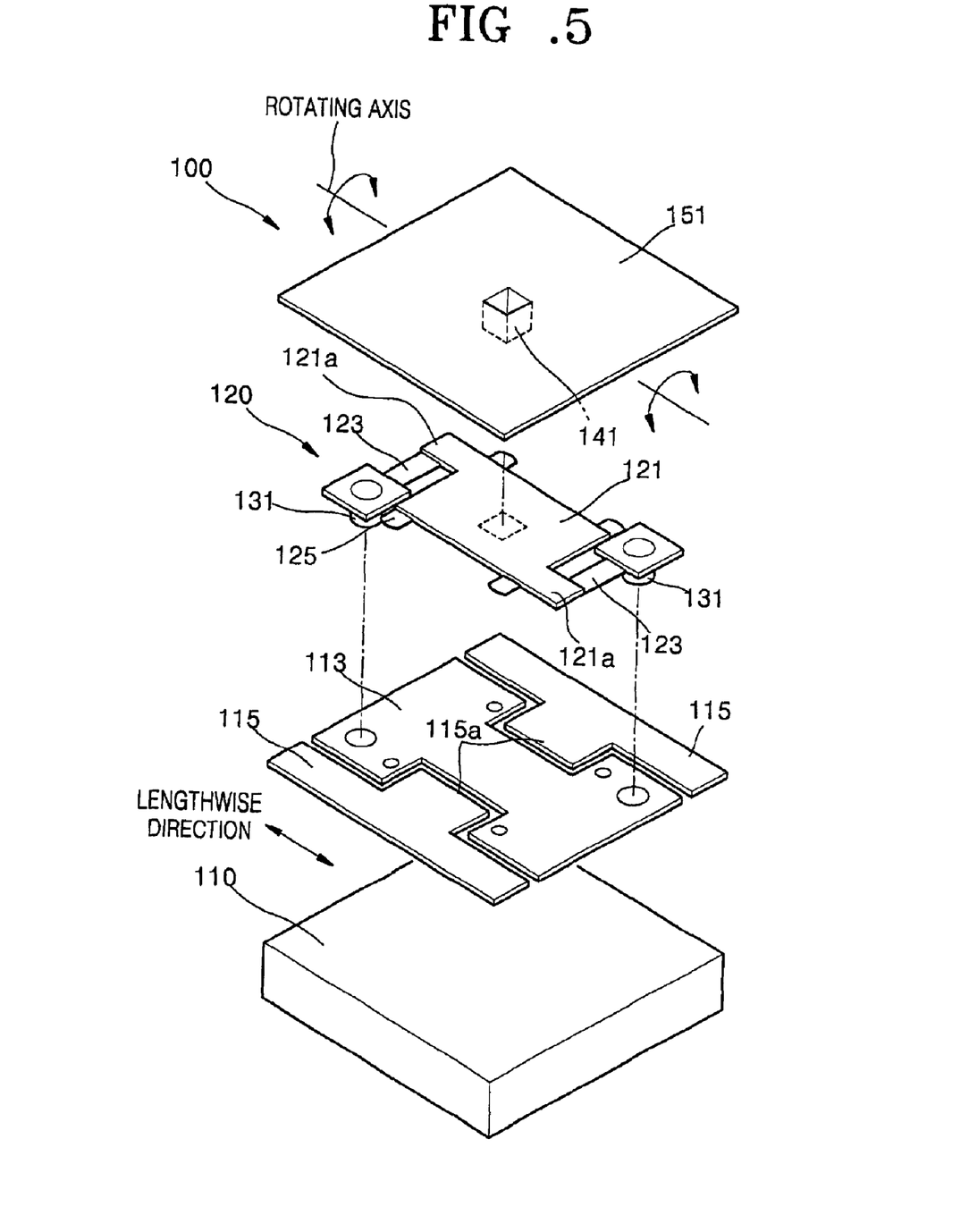
FIG. 5 is an exploded perspective view of a micro-mirror device for an image display device according to an embodiment of the present invention.

Referring to FIGS. 4 and 5, a micro-mirror device 100 according to an embodiment of the present invention includes a substrate 110, a landing pad 113 and a pair of base electrodes 115 provided on the substrate 110. The invention further includes, a pair of first posts 131 protruding from the landing pad 113, a girder 120 installed so as to pivot toward the sides of the base electrodes 115, a second post 141 protruding from the girder 120, and a mirror 151 pivotably supported by the second post 141.

The pair of base electrodes 115 are separated by a predetermined distance from each other on the substrate 110, with the landing pad 113 therebetween. The base electrodes 115 are formed to a predetermined length on opposite sides of the substrate 110, respectively, so that an electrostatic attraction is exerted upon opposite sides of the mirror 151. The landing pad 113, on which the pair of first posts 131 are installed, also acts as an electrode for applying power to the mirror 151. Hence, the electrostatic attraction is generated between the base electrodes 115 and the mirror 151, when power is applied to the base electrodes 115 and the landing pad 113. The generated electrostatic attraction rotates the mirror 151. Preferably, each of the base electrodes 115 has an inwardly-protruding portion 115a to increase the area that faces the mirror 151, so that a driving force due to the electrostatic attraction is increased.

The pair of first posts 131 protrude vertically, a predetermined amount, from the landing pad 113 and are isolated from each other by a predetermined distance. The pair of first posts 131 also act to support the girder 120. The girder 120 is installed so as to pivot toward the sides of the landing pad 113 by the electrostatic attraction, and has a rotating axis that is formed in a direction equal to a lengthwise direction of the base electrode 115.

The girder 120 includes a support plate 121 for supporting the second post 141, and a pair of springs 123 that connect the support plate 121 to the upper surface of each of the first posts 131 and pivotally support the support plate 121.

The support plate 121 has connecting portions 121a which protrude from the sides of the support plate in a direction parallel to the lengthwise direction of the base electrodes 115. The connecting portions 121a are point symmetrical to each other with respect to the cross-section of a portion contacting the second post 141. Each of the pair of springs 123 connects the upper surface of each of the pair of first posts 131 to each of the pair of connecting portions 121a. The springs 123 receive opposite elasticities due to the electrostatic attraction between the mirror 151 and the base electrodes 115. Accordingly, when the mirror 151 is pivoted vertically by the electrostatic attraction, the pair of springs 123 are rotated in opposite directions. Also, when the direction of pivoting is changed, the directions of rotational moments applied to the springs 123 are also changed. Each of the springs 123 receives both upward and downward elasticities, so that the elasticity coefficient of each spring 123 does not change.

Preferably, the girder 120 further includes landing tips 125 protruding from opposite sides of the support plate 121 in a direction corresponding to the direction of pivot of the support plate 121. The landing tips 125 are inclined to approximate a point contact with the landing pad 113. Also, the landing tips 125 are formed to be thinner than the support plate 121 so that their ends are elastically deformed when contacting the support plate 121, thus achieving shock-absorption. Also, elastic energy is accumulated when the landing tips 125 are elastically deformed, and the accumulated elastic energy is changed into kinetic energy for the girder 120 and the mirror 151, when the mirror 151 is restored to its original location by removal of the driving voltage. Consequently, adhesive contact of the mirror 151 with the base electrodes 115 is prevented, and contact of the girder 120 with the base electrodes 115 is smoothly removed.

The second post 141 protrudes a predetermined amount above the center of the support plate 121, and supports the center of the mirror 151. The inclination angle of the mirror 151 depends on the electrostatic attraction, which changes the reflection angle of light incident upon the upper surface of the mirror 151. Here, the height of each of the first posts 131 is lower than that of the second post 141. Accordingly, the girder 120 contacts the landing pad 113 instead of the sides of the mirror 151 making contact with the base electrodes 115.

Figure 6:
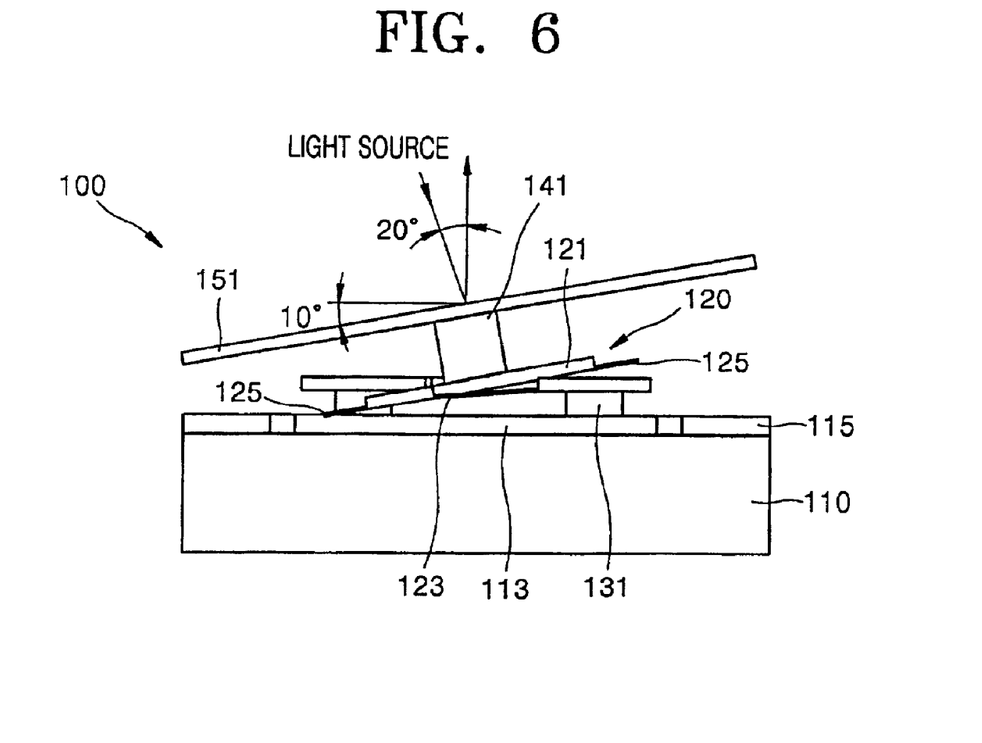
FIG. 6 is a view illustrating the operation of a micro-mirror device for an image display apparatus according to the present invention.

Referring to FIG. 6, the micro-mirror device 100, according to an embodiment of the present invention having such a structure, is pivoted in one direction by an electrostatic attraction between the base electrodes 115 and the mirror 151 when a driving force is applied. The pivoting is stopped by the contact of one landing tip 125 with the landing pad 113. In this case, light from a light source is incident upon the upper surface of the mirror 151 and is used as effective light, which proceeds toward a screen via a projection lens (not shown) in an image display apparatus. The pivot direction of the mirror 151 can be changed by changing the driving force, which can cause light to be radiated onto and reflected by the upper surface of the mirror 151 along a different path, thus being rendered ineffective.

Figure 7:
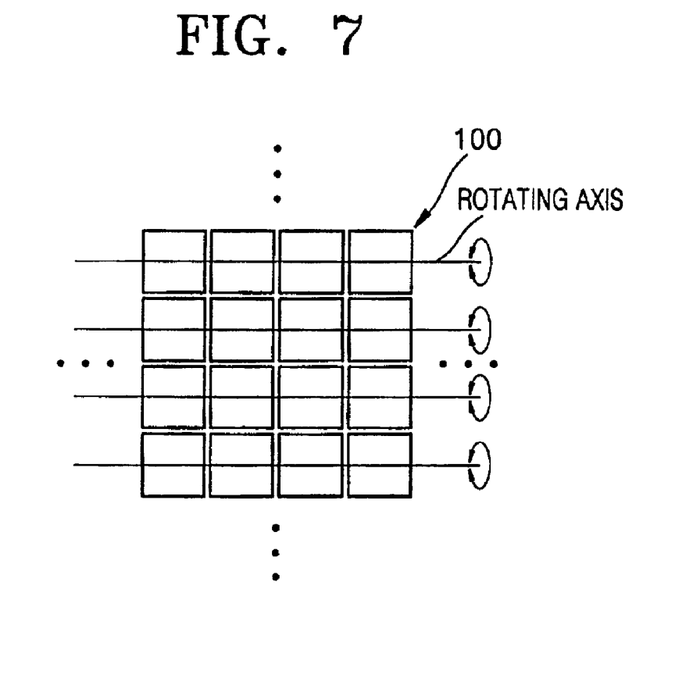
FIG. 7 is a plan view illustrating a part of an array of side-driven micro-mirror devices for an image display apparatus according to the present invention.
Figure 8:
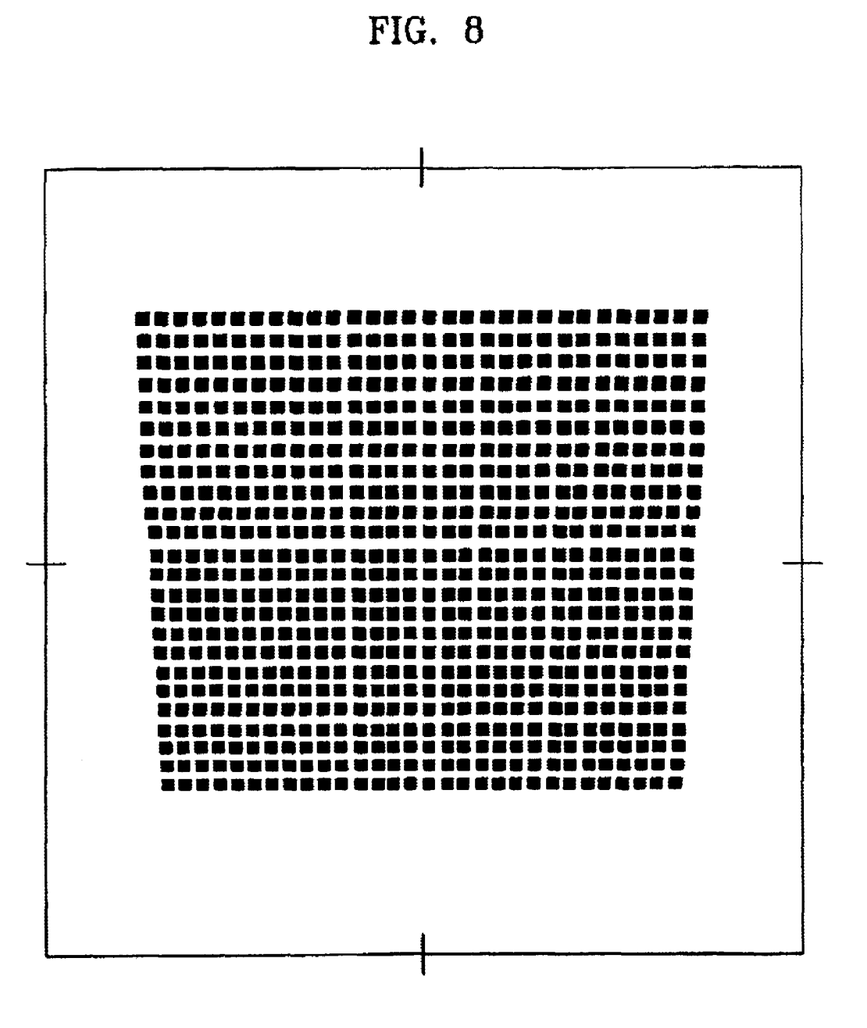
FIG. 8 is a plan view illustrating the shapes of micro-mirror devices according to the present invention, viewed from a light source, when light is converged to 10° angles and illuminated to side-driven micro-mirror devices for an image display apparatus which has a tilt angle of 20°.

In one embodiment, the micro-mirror device 100 is adopted in an image display apparatus, and a plurality of micro-mirror devices 100 are arrayed in a two-dimensional structure, as shown in FIG. 7. The plurality of micro-mirror devices 100 are driven on their sides on the basis of a rotating axis. When the micro-mirror devices 100 are driven as described above, the projected shapes of the micro-mirror devices 100 are as shown in FIG. 8, when viewed from the perspective of a light source for radiating light to the micro-mirror devices 100. Here, a horizontal axis denotes a degree of defocusing, and a vertical axis denotes the upper surface.

FIG. 8 illustrates the projected shapes of the micro-mirror devices 100 viewed from the light source, when the light is converged at 100 angles and illuminated to the side-driven micro-mirror devices for an image display apparatus, which has a pivot angle of ±10°, that is, a tilt angle of 20°. In the case where the side-driven micro-mirror devices 100 are adopted, an optical loss can be reduced by controlling an area ratio of the micro-mirror device 100 array and a ratio of horizontal power to vertical power, of light from the light source, thus leading to high optical efficiency of about 98% or greater.

In the micro-mirror device for an image display apparatus having the structure described above, pivoting of the mirror 151 using the rotation moment of the girder 120 determines the traveling path of light, so that an optical arrangement of an optical system such as a projection lens is easily made. Thus, the sideward driving of the micro-mirror devices 100 enables the control of the area ratio of the micro-mirror device array and the horizontal/vertical power ratio of radiated light, which leads to the high optical efficiency.

It is contemplated that numerous modifications may be made to the apparatus and method of the present invention without departing from the spirit and scope of the invention as defined in the claims.

What is claimed is:

1. A micro-mirror device for an image display apparatus, comprising:
    a substrate;
    a landing pad provided on the substrate;
    a pair of base electrodes provided on opposite sides of the landing pad;
    a pair of first posts that protrude from an upper surface of the landing pad, which are isolated from each other by a predetermined interval;
    a girder supported by the pair of first posts, which is operative to pivot toward sides of the base electrodes;
    a second post protruding from an upper surface of the girder; and
    a mirror supported by the second post, which reflects incident light, and receives power via the landing pad,
    wherein the mirror is pivoted toward the sides of the landing pad by an electrostatic attraction between the pair of base electrodes and the mirror,
    wherein the girder includes:
        a support plate for supporting the second post, the support plate having connecting portions which protrude from sides of the support plate in a direction parallel to a lengthwise direction of the pair of base electrodes and are point-symmetrical to each other on the basis of the second post; and
        a pair of springs which connect an upper surface of each of the pair of first posts to each of the connecting portions,
        wherein the pair of springs are elastically deformed when the mirror is vertically inclined by the electrostatic attraction between the mirror and the base electrodes.

2. The micro-mirror device for an image display apparatus of claim 1, wherein each of the pair of base electrodes has a protruding portion protruding inward to widen an area that faces the girder, and
    wherein a longest side of the base electrode is parallel to a side of the mirror.

3. The micro-mirror device for an image display apparatus of claim 1, wherein the girder further comprises:
    landing tips protruding from opposite sides of the support plate, which contact the landing pad during pivoting.

4. The micro-mirror device for an image display apparatus of claim 1, wherein the pair of first posts have a height that is lower than a height of the second post, so that the mirror does not make an adhesive contact with the pair of base electrodes.

5. A micro-mirror device for an image display apparatus comprising:
    a substrate;
    a landing pad provided on the substrate;
    a pair of base electrodes provided on opposite sides of the landing pad;
    a pair of first posts that protrude from an upper surface of the landing pad, which are isolated from each other by a predetermined interval;
    a girder supported by the pair of first posts, which is operative to pivot toward sides of the base electrodes;
    a second post protruding from an upper surface of the girder; and
    a mirror supported by the second post, which reflects incident light, and receives power via the landing pad,
    wherein the mirror is pivoted toward the sides of the landing pad by an electrostatic attraction between the pair of base electrodes and the mirror,
    wherein the pair of first posts have a height that is lower than a height of the second post, so that the mirror does not make an adhesive contact with the pair of base electrodes, and
    wherein the girder includes:
        a support plate for supporting the second post, the support plate having connecting portions which protrude from sides of the support plate in a direction parallel to a lengthwise direction of the pair of base electrodes and are point-symmetrical to each other on the basis of the second post; and
        a pair of springs which connect an upper surface of each of the pair of first posts to each of the connecting portions,
        wherein the pair of springs are elastically deformed in opposite directions when the mirror is vertically inclined by the electrostatic attraction between the mirror and the pair of base electrodes.

6. The micro-mirror device for an image display apparatus of claim 5, wherein the girder further comprises:
    landing tips protruding from opposite sides of the support plate, which contact the landing pad during pivoting.

7. The micro-mirror device for an image display apparatus of claim 4, wherein each of the pair of base electrodes has a protruding portion protruding inward to widen an area that faces the girder.

8. The micro-mirror device for an image display apparatus of claim 1, wherein the mirror is pivoted around an axis that is parallel to a lengthwise direction of the pair of base electrodes, the lengthwise direction being parallel to a side of the mirror.

9. An image display device, comprising:
    a plurality of micro-mirror devices, wherein each of the plurality of micro-mirror devices comprises:
        a substrate;
        a landing pad provided on the substrate;
        a pair of base electrodes provided on opposite sides of the landing pad;
        a pair of first posts that protrude from an upper surface of the landing pad, which are isolated from each other by a predetermined interval;
        a girder supported by the pair of first posts, which is operative to pivot toward sides of the base electrodes;
        a second post protruding from an upper surface of the girder; and
        a mirror supported by the second post, which reflects incident light, an receives power via the landing pad, wherein the mirror is pivoted toward the sides of the landing pad by an electrostatic attraction between the pair of base electrodes and the mirrors, wherein said girder includes a pair of spring members, and said mirror has an axis of rotation which is perpendicular to a lengthwise direction of said pair of spring members, wherein the pair of spring members respectively connect the girder to the pair of first posts.

10. The image display device of claim 9, wherein the plurality of micro-mirror devices are arrayed to form a two-dimensional structure.

11. The image display device of claim 9, wherein an area ratio of each of the plurality of micro-mirror devices is controlled by the electrostatic attraction between the pair of base electrodes and the mirror.

12. A method of reflecting light using a micro-mirror device in an image display apparatus, comprising:

supplying a driving voltage to at least one of a pair of base electrodes of the micro-mirror device, the base electrodes having a landing pad disposed therebetween;

creating an electrostatic attraction between the at least one of the pair of the base electrodes and a mirror, wherein the mirror is pivotally supported by a pair of spring members so as to be pivoted around an axis formed in a lengthwise direction of the pair of base electrodes such that one of the spring members is forced in a direction opposite a direction of the other of the spring members when the mirror is pivoted, the spring members being connected to a support plate; and altering the driving voltage which is supplied to the at least one of the pair of base electrodes so that a reflection angle of light incident upon the mirror is controlled and so that landing tips, which protrude from the support plate, contact the landing pad when the mirror is pivoted.

13. The micro-mirror device for an image display apparatus of claim 1, wherein the pair of base electrodes oppose each other in a non-diagonal manner with respect to the mirror.

14. The image display device of claim 9, wherein the pair of base electrodes oppose each other in a non-diagonal manner with respect to the mirror.

15. A micro-mirror device for an image display apparatus comprising:

a substrate;

a landing pad provided on the substrate;

a pair of base electrodes provided on opposite sides of the landing pad;

a pair of first posts that protrude from an upper surface of the landing pad, which are isolated from each other by a predetermined interval;

a girder supported by the pair of first posts, which is operative to pivot toward sides of the base electrodes;

a second post protruding from an upper surface of the girder; and a mirror supported by the second post, which reflects incident light, and receives power via the landing pad, wherein the mirror is pivoted toward the sides of the landing pad by an electrostatic attraction between the pair of base electrodes and the mirror, wherein said girder includes a pair of spring members, each spring member respectively having an end in connection with one of said first posts, and wherein said spring members are disposed so that one of said spring members is forced in a direction opposite direction of the other of said spring members when said mirror is pivoted, and wherein the girder includes landing tips which protrude from sides of the girder and contact the landing pad when the mirror is pivoted.

16. A micro-mirror device for an image display apparatus, comprising:

a substrate;

a landing pad provided on the substrate;

a pair of base electrodes provided on opposite sides of the landing pad;

a pair of first posts that protrude from an upper surface of the landing pad which are isolated from each other by a predetermined interval;

a girder supported by the pair of first posts, which is operative to pivot toward sides of the base electrodes;

a second post protruding from an upper surface of the girder; and a mirror supported by the second post, which reflects incident light, and receives power via the landing pad, wherein the mirror is pivoted toward the sides of the landing pad by an electrostatic attraction between the pair of base electrodes and the mirror, wherein said girder includes a pair of spring members, and said mirror has an axis of rotation which is perpendicular to a lengthwise direction of said pair of spring members, wherein the pair of spring members respectively connect the girder to the pair of first posts.

17. An image display device, comprising:

a plurality of micro-mirror devices, wherein each of the plurality of micro-mirror devices comprises:

a substrate;

a landing pad provided on the substrate;

a pair of base electrodes provided on opposite sides of the landing pad;

a pair of first posts that protrude from an upper surface of the landing pad, which are isolated from each other by a predetermined interval;

a girder supported by the pair of first posts, which is operative to pivot toward sides of the base electrodes;

a second post protruding from an upper surface of the girder; and a mirror supported by the second post, which reflects incident light, and receives power via the landing pad, wherein the mirror is pivoted toward the sides of the landing pad by an electrostatic attraction between the pair of base electrodes and the mirror, wherein said girder includes a pair of spring members, each spring member respectively having an end in connection with one of said first posts, and wherein said spring members are disposed so that one of said spring members is forced in a direction opposite a direction of the other of said spring members when said mirror is pivoted, and wherein the girder includes landing tips which protrude from sides of the girder and contact the landing pad when the mirror is pivoted.

* * * * *